( 12 ) United States Patent
Furutani

(10) Patent No.: US 9,007,606 B2
(45) Date of Patent: Apr. 14, 2015

(54) IMAGE FORMING APPARATUS

(71) Applicant: KYOCERA Document Solutions Inc., Osaka (JP)

(72) Inventor: Hiroshi Furutani, Osaka (JP)

(73) Assignee: KYOCERA Document Solutions Inc., Osaka-shi (JP)

( * ) Notice: Subject to any disclaimer, the term of this patent is extended or adjusted under 35 U.S.C. 154(b) by 0 days.

(21) Appl. No.: 13/682,890

(22) Filed: Nov. 21, 2012

(65) Prior Publication Data

US 2013/0135660 A1 May 30, 2013

(30) Foreign Application Priority Data

Nov. 25, 2011 (JP) ................... 2011-258341

(51) Int. Cl.
*G06K 15/00* (2006.01)
*G06F 21/34* (2013.01)
*H04N 1/44* (2006.01)
*G06F 21/60* (2013.01)

(52) U.S. Cl.
CPC ............... *G06F 21/34* (2013.01); *G06K 15/00* (2013.01); *H04N 1/44* (2013.01); *G06F 21/608* (2013.01)

(58) Field of Classification Search
CPC ....... G06F 21/608; G06F 21/31; G06F 21/34; G06F 21/35
USPC ................................. 358/1.13–1.15
See application file for complete search history.

(56) References Cited

U.S. PATENT DOCUMENTS

2006/0092453 A1* 5/2006 Okada et al. .................. 358/1.14
2010/0238495 A1* 9/2010 Sugimoto .................... 358/1.15

FOREIGN PATENT DOCUMENTS

| JP | 1-100692 A | 4/1989 |
| JP | 2005-266699 A | 9/2005 |
| JP | 2008-236366 A | 10/2008 |
| JP | 2010-141501 A | 6/2010 |

OTHER PUBLICATIONS

Machine Translation of JP2008-236366.
Machine Translation of JP2005-266699.

* cited by examiner

*Primary Examiner* — Marivelisse Santiago Cordero
*Assistant Examiner* — Kent Yip
(74) *Attorney, Agent, or Firm* — Knobbe Martens Olson & Bear LLP

(57) ABSTRACT

An image forming apparatus 1 includes an image forming portion 12, a setting acceptance portion 101, an identification information acquisition portion 92, and a control portion 100. The setting acceptance portion 101 accepts a job setting content from a user. After the job setting content is accepted by the setting acceptance portion 101, the identification information acceptance portion 92 acquires identification information of the user through communication with a key card 8. When the acquired identification information is authentic and the key card 8 is incommunicable with the identification information acquisition portion 92, the control portion 100 executes a job according to the job setting content.

2 Claims, 5 Drawing Sheets

IMAGE FORMING APPARATUS

INCORPORATION BY REFERENCE

This application is based upon and claims the benefit of priority from the corresponding Japanese Patent Application No. 2011-258341, filed in the Japan Patent Office on Nov. 25, 2011, the entire contents of which are incorporated herein by reference.

BACKGROUND

The present disclosure relates to an image forming apparatus, more particularly, a technique in determining whether the activation of the image forming apparatus is permitted through user authentication.

An image forming apparatus has heretofore been known which reads a user ID of a user from an ID card storing the user ID, and permits the user to activate the apparatus when the authenticity of the read user ID is verified with respect to the activation of the apparatus by the user. In addition, an automatic vending machine has been known, which is ready for selling its product when an inserted ID card is taken out of the machine by a person after the authentication of the person is made, such that the machine prevents the person from forgetting to pick up his or her ID card.

However, it is difficult for the above-mentioned image forming apparatus to prevent the user from forgetting to pick up his or her ID card. Although the above-mentioned automatic vending machine can prevent the person from forgetting to pick up his or her ID card, the ID card remains inserted in the machine during an operation of the machine performed by the person after the authentication. Accordingly, it may be likely that the person lefts the ID card which may result in a theft if the person leaves the vending machine and moves to another place during an operation of the vending machine.

SUMMARY

In an aspect of the present disclosure, an image forming apparatus includes a setting acceptance portion, an identification information acquisition portion, and a control portion. The setting acceptance portion is configured to accept from a user a job setting content for setting a job executable by the image forming apparatus. The identification information acquisition portion is configured to acquire identification information from an external storage medium storing the identification information specific to the user through communication with the external storage medium after the job setting content is accepted by the setting acceptance portion. The control portion is configured to execute the job being set in accordance with the accepted job setting content for a case where the identification information acquired by the identification information acquisition portion is authentic and the identification information acquisition portion becomes incommunicable with the external storage medium.

DETAILED DESCRIPTION

Figure 1:
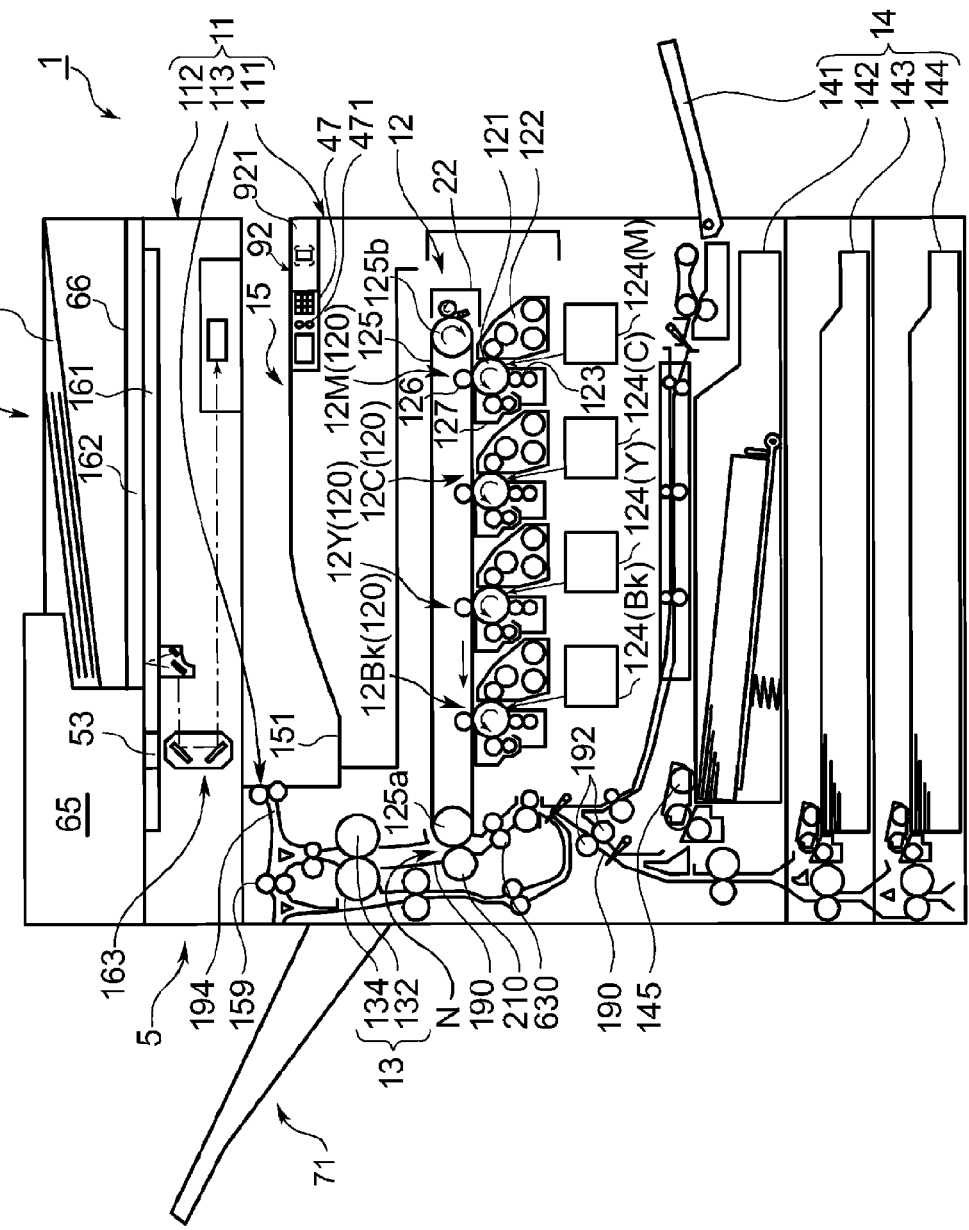
FIG. 1 is a front sectional view showing a setup of an image forming apparatus according to an embodiment of the present disclosure.

Hereinafter, an image forming apparatus according to an embodiment of the present disclosure will be described with reference to the accompanying drawings. FIG. 1 is a front sectional view showing a setup of an image forming apparatus according to an embodiment of the present disclosure. An image forming apparatus 1 is a multifunction peripheral which includes a plurality of functions, for example, copying machine function, printer function, scanner function, and facsimile function. The image forming apparatus 1 includes an apparatus main body 11 which is provided with an image forming portion 12, an image fixing unit 13, a paper feeding portion 14, a paper discharge portion 15, a document feeding portion 6, and a document reading portion 5.

The apparatus main body 11 includes a lower main body 111, an upper main body 112 which is arranged above the lower main body 111 to be opposite to each other, and a connecting portion 113 provided between the upper main body 112 and the lower main body 111. The connecting portion 113 is a structure that connects the lower main body 111 with the upper main body 112 such that the paper discharge portion 15 is formed therebetween. The connecting portion 113 stands upright at a left portion and a rear portion of the lower main body 111 in FIG. 1 and is L-shaped when viewed in a plan view. The upper main body 112 is supported by an upper end portion of the connecting portion 113. The upper main body 112 includes the document reading portion 5 and the document feeding portion 6.

An operation portion 47 is provided at a front portion of the image forming apparatus 1, through which operational instructions are entered by a user. Furthermore, an identification information acquisition portion 92 is provided at the front portion of the image forming portion 1 as a radio frequency identification (RFID) reader. The identification information acquisition portion 92 reads identification information of the user stored in an external storage medium (to be described later), which is placed over or on a reading portion 921, through radio frequency identification (RFID) communication.

The document reading portion (image reading portion) 5 includes a contact glass (document mounting plate) 161, a document retaining cover 162, and a reading mechanism 163. The contact glass (document mounting plate) 161 is installed in an upper opening of the upper main body 112, and is for placing a document on it. The document retaining cover 162 presses a document placed on the contact glass 161 and is configured to be openable and closable. The reading mechanism 163 reads an image on the document placed on the contact glass 161. The reading mechanism 163 optically reads the image on the document with an image sensor such as charge coupled device (CCD) or complementary metal oxide semiconductor (CMOS) to generate image data.

The document feeding portion 6 includes a document placing base 61 on which a document is placed, a document discharge portion 66 to which a document having undergone image reading is discharged, and a document conveying mechanism 65. The document conveying mechanism 65 includes a paper feeding roller, a conveying roller, and a sheet turning-over mechanism, each of which is not shown. The document conveying mechanism 65 feeds documents placed on the document placing base 61 one by one and conveys each document to a position opposite to a document reading slit 53 by driving applied by the paper roller and the conveying roller. After the document conveying mechanism 65 conveys a document so as to be read by the reading mechanism 163 through the document reading slit 53, it discharges the document onto the document discharge portion 66. In addition, the sheet turning-over mechanism turns over a document upside down and conveys this document to the position opposite to the document reading slit 53 again. As a result, the document conveying mechanism 65 allows images on both sides of the document to be read by the reading mechanism 163 through the document reading slit 53.

The document feeding portion 6 is provided pivotally with respect to the upper main body 112 such that its front part is movable upward. When a user moves the front part of the document feeding portion 6 upward to cause a top face of the contact glass 161 to be exposed, it is possible for the user to place a document to be read, for example, a spread book on the top face of the contact glass 161.

The image forming portion 12, the image fixing unit 13 and the paper feeding portion 14 are provided inside the lower main body 111. The upper main body 111 is provided with the document reading portion 5. The paper feeding portion 14 includes paper cassettes 142, 143, 144, each of which is insertable into and removable from the apparatus main body 11. Stacked sheets of paper (an example of recording medium) are accommodated in each of the paper cassettes 142, 143, 144.

The image forming portion 12 performs forming a toner image on a sheet of recording paper fed from the paper feeding portion 14. The image forming portion 12 includes an image forming unit 120, an intermediate transfer belt 125, and a secondary transfer roller 210. The image forming unit 120 includes a magenta image forming unit 12M using magenta toner, a cyan image forming unit 12C using cyan toner, a yellow image forming unit 12Y using yellow toner, and a black image forming unit 12Bk using black toner, those units being arranged in order from upstream to downstream in a moving direction of the intermediate transfer belt 125. Hereinafter, when the respective image forming units are described without being distinguished from each other, each of those image forming units will be referred to as "image forming unit 120". The intermediate transfer belt 125 is stretched between a plurality of rollers such as a drive roller 125a (roller opposite to the secondary transfer roller 210) such that it is capable of moving endlessly in a direction of sub-scanning for image forming. The secondary transfer roller 210 is in contact with an external surface of the intermediate transfer belt 125, where the intermediate transfer belt 125 is on the drive roller 125a.

Each image forming unit 120 integrally includes a photosensitive drum 121, a developing unit 122 for supplying toner to the photosensitive drum 121, a toner cartridge (not shown) storing toner, a charging unit 123, an exposure unit 124, a primary transfer roller 126, and a drum cleaning unit 127.

The photosensitive drum 121 forms an electrostatic latent image and a toner image based on the electrostatic latent image on a peripheral surface thereof. The developing unit 122 supplies toner to the photosensitive drum 121. The developing unit 122 is replenished with toner from the toner cartridge at an appropriate timing.

The charging unit 123 is located immediately below the photosensitive drum 121. The charging unit 123 uniformly charges the peripheral surface of the photosensitive drum 121.

The exposure unit 124 is located below the photosensitive drum 121 and further below the charging unit 123. The exposure unit 124 irradiates the charged peripheral surface of the photosensitive drum 121 with laser beams corresponding to respective colors based on image data input from a computer or image data acquired by the document reading portion 5 in order to form an electrostatic latent image on the peripheral surface of the photosensitive drum 121.

The developing unit 122 supplies toner to make it layered on an electrostatic latent image on the peripheral surface of the photosensitive drum 121 rotating in a direction indicated with an arrow in FIG. 1, and forms a toner image corresponding to the image data on the peripheral surface of the photosensitive drum 121.

The intermediate transfer belt 125 is arranged above the photosensitive drums 121. The intermediate transfer belt 125 is stretched between the drive roller 125a on the left in FIG. 1 and a driven roller 125b on the right such that it is endlessly movable. A downward external peripheral surface of the intermediate transfer belt 125 is in contact with a peripheral surface of each photosensitive drum 121.

A primary transfer roller 126 is provided opposite to each photosensitive drum 121 across the intermediate transfer belt 125. Transfer bias is applied to the primary transfer roller 126 by a transfer bias applying mechanism (not shown). The primary transfer roller 126 transfers the toner image formed on the external peripheral surface of the photosensitive drum 121 onto the surface of the intermediate transfer belt 125.

A control portion 100 (see FIG. 1) controls driving of the primary transfer roller 126 and the image forming unit 120 for each color. The control portion 100 causes toner images to be transferred and overlapped on the same position of the surface of the intermediate transfer belt 125 in such sequence as, a magenta toner image formed by the magenta image forming unit 12M, a cyan toner image formed by the cyan image forming unit 12C, a yellow toner image formed by the yellow image forming unit 12Y, and a black toner image formed by the black image forming unit 12Bk. As a result, a color toner image is formed on the surface of the intermediate transfer belt 125 (intermediate transfer (primary transfer)).

Transfer bias is applied to the secondary transfer roller 210 by a transfer bias applying mechanism (not shown). The secondary transfer roller 210 transfers the color toner image formed on the surface of the intermediate transfer belt 125 onto a sheet of recording paper fed from the paper feeding portion 14. The secondary transfer roller 210 is provided in contact with the external peripheral surface of the intermediate transfer belt 125 at a portion of a paper conveying path 190, where the intermediate transfer belt 125 is on the drive roller 125a. A nip N where the toner image is secondarily transferred to a sheet of recording paper is formed between the secondary transfer roller 210 and the drive roller 125a across the intermediate transfer belt 125. A sheet of recording paper conveyed in the paper conveying path 190 is nipped at the nip N while it is pressed by the intermediate transfer belt 125 and the secondary transfer roller 210. Here, the toner image on the intermediate transfer belt is secondarily transferred onto the sheet of recording paper. A registration roller 630 is disposed upstream of the nip N between the secondary transfer roller 210 and the drive roller 125a, in a conveying direction of a sheet of recording paper conveyed by a pair of conveying rollers 192.

A drum cleaning unit 127 is provided on the left side of each photosensitive drum 121 in FIG. 1 to remove residual toner left on the peripheral face of each photosensitive drum 121. The peripheral face of the photosensitive drum 121, which has been cleaned by the drum cleaning unit 127, moves to face the charging unit 123 again for new charging treatment.

At a left position relative to the image forming unit 12 in FIG. 1, the paper conveying path 190 is formed to extend vertically. The pair of conveying rollers 192 is provided at an appropriate position in the paper conveying path 190. The pair of the conveying rollers 192 conveys the sheet of recording paper fed from the paper feeding portion 14 toward the nip N and the image fixing unit 13. That is, the sheet of recording paper is conveyed by the conveying mechanism including the pair of conveying rollers 192 arranged at the appropriate position.

The image fixing unit 13 includes a heating roller 132 internally containing an electric heater as a heating source and a pressing roller 134 disposed opposite to the heating roller 132. While the sheet of recording paper passes through a fixing nip between the heating roller 132 and the pressure roller 134, the image fixing unit 13 performs image fixing processing by applying heat from the heating roller 132 to a toner image on the sheet of recording paper transferred in the image forming portion 12. The sheet of recording paper that has finished image fixing processing is discharged through a discharging sheet conveying path 194 to a discharge tray 151 which is provided at a top of the lower main body 111.

A cleaning unit 22 is provided opposite to a part of the external peripheral surface of the intermediate transfer belt 125 which is on the driven roller 125b.

The paper feeding unit 14 includes a manual feeding tray 141 and paper feeding cassettes 142, 143, and 144. The manual feeding tray 141 is openably and closably provided at a right side wall of the apparatus main body 11 in FIG. 1. The paper feeding cassettes 142, 143, 144 are insertably and removably installed at lower positions than the exposure unit 124 inside the lower main body 111.

The manual feeding tray 141 is provided at a lower portion on the right side face of the lower main body 111 and feeds a sheet of recording paper to the image forming portion 12 by manual feeding. The paper feeding cassettes 142, 143, and 144 each accommodate stacked sheets of recording paper. A pickup roller 145 is provided above each of the paper feeding cassettes 142, 143 and 144. The pickup roller 145 feeds an uppermost sheet of the stacked sheets of recording paper accommodated in each of the paper feeding cassettes 142, 143, and 144 towards the paper conveying path 190.

The paper discharge portion 15 is formed between the lower main body 111 and the upper main body 112. The paper discharge portion 15 is equipped with the discharge tray 151 formed on the top face of the lower main body 111. The discharge tray 151 is a tray to which a sheet of recording paper is discharged, for which a toner image is formed by the image forming portion 12 and image fixing processing is performed by the image fixing unit 13.

Figure 2:
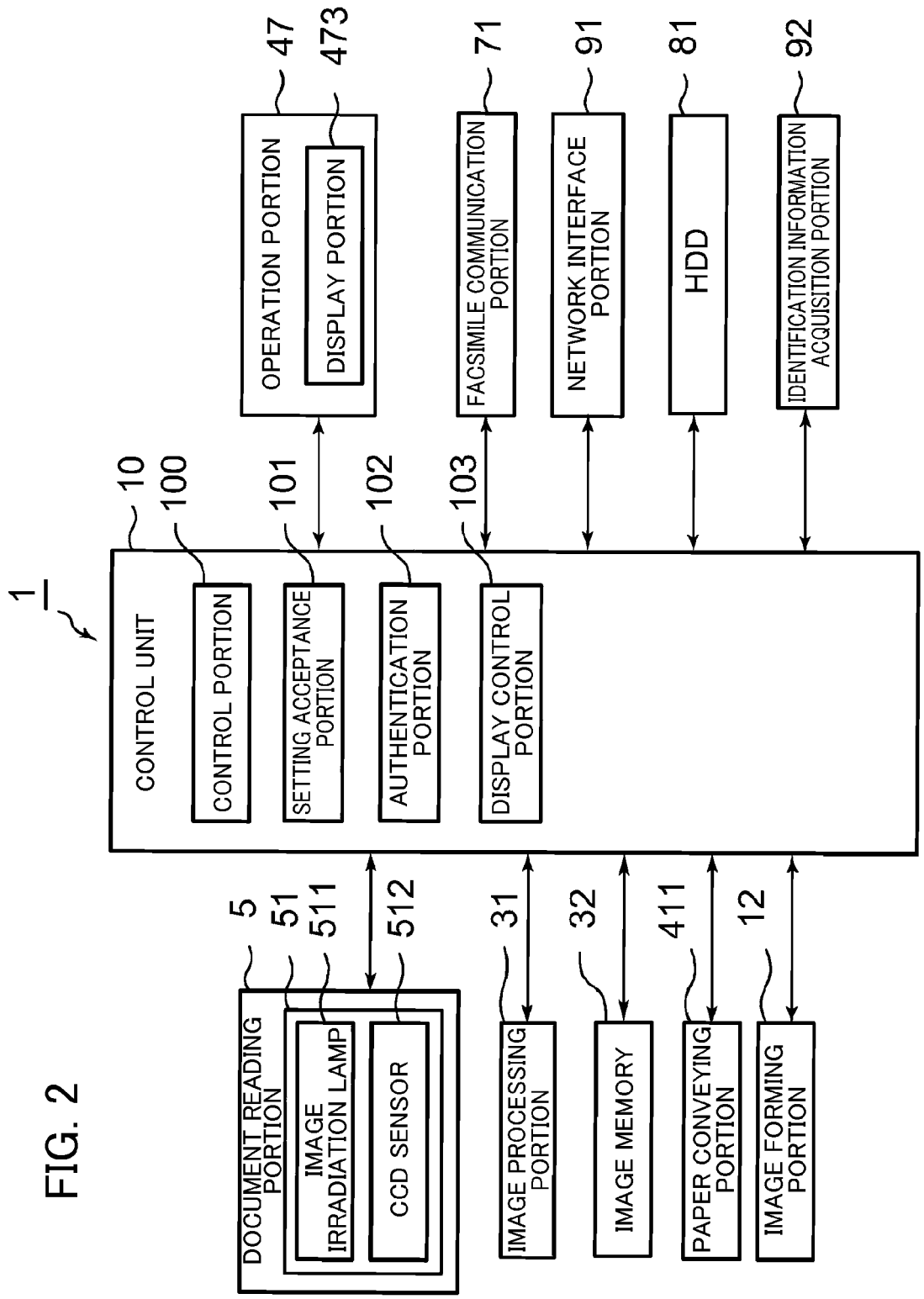
FIG. 2 is a functional block diagram schematically showing a main internal setup of the image forming apparatus.

Next, an electrical setup of the image forming apparatus 1 will be described below. FIG. 2 is a functional block diagram schematically showing a main internal setup of the image forming apparatus 1.

The image forming apparatus 1 includes a control unit 10. The control unit 10 is composed of a central processing unit (CPU), RAM, ROM, and dedicated hardware circuit and executes overall control for operation of the image forming apparatus 1.

The control unit 10 is connected to a document reading portion 5, an image processing portion 31, an image memory 32, a paper conveying portion 411, an image forming portion 12, an operation portion 47, a facsimile communication portion 71, a network interface portion 91, and a hard disk drive (HDD) 81. The control unit 10 controls the operation of the respective connected portions described above and performs transmission and reception of signals or data with the respective portions.

The control unit 10 includes a control portion 100 for executing overall control of the operation of the above-mentioned image forming apparatus 1. The control portion 100 controls driving and processing of each portion necessary for controlling the operation of each of scanner function, printer function, copy function and facsimile function, according to an instruction for job execution entered by a user through the operation portion 47 or a personal computer connected to on a network.

The document reading portion 5 includes a scanner unit 51. The scanner unit 51 is composed of the above-mentioned reading mechanism 163 which includes an image irradiation lamp 511 and a charge coupled device (CCD) sensor 512. The document reading portion 5 reads an image from a document by irradiating the document with the image irradiation lamp 511 and receiving light reflected from it with the CCD sensor 512.

The image processing portion 31 performs necessary image processing on image data of the image read by the image reading portion 5. For example, the image processing portion 31 performs a predetermined image processing to improve the quality of the image formed by the image forming portion 12 based on the image read by the image reading portion 5.

The image memory 32 stores the image data read by the document reading portion 5.

The paper conveying portion 411 is composed of the pickup roller 145 and the conveying roller 192, and conveys sheets of recording paper accommodated in the manual feeding tray 141 and the paper feeding cassettes 142, 143 and 144 to the image forming portion 12 and the discharge tray 151.

As described above, the image forming portion 12 includes the image forming units 12M, 12C, 12Y, 12Bk, the intermediate transfer belt 125 wound around the drive roller 125a, the secondary transfer roller 210, and the image fixing unit 13. The image data, which is an output delivered by the image forming portion 12, includes image data read by the document reading portion 5, image data transmitted from a client computer within a local area via the network interface portion 91, and the like.

As shown in FIGS. 1 and 2, the operation portion 47 includes a touch panel portion and an operation key portion. The touch panel portion and the operation key portion accept an instruction from a user about a variety of operation and processing which are executable by the image forming apparatus 1. The touch panel portion includes a display portion 473 provided with a touch panel, such as a liquid crystal display (LCD).

The facsimile communication portion 71, which includes a coding/decoding portion (not shown), a modulation/demodulation portion, and a network control unit (NCU), transmits a facsimile through a public telephone network. The facsimile communication portion 71 transmits image data of a document read by the document reading portion 5, for example, to a facsimile unit via telephone network, and receives image data transmitted from a facsimile unit.

The HDD 81 stores image data read by the document reading portion 5. The image data stored in the HDD 81 is used for image formation performed by the image forming portion 12, and may be transmitted to a client computer connected to the image forming apparatus 1 via network.

The network interface portion 91 is composed of a communication module such as a LAN board, and exchanges a variety of data with devices (personal computers, etc.,) within a local area via a LAN connected to the network interface portion 91.

The identification information acquisition portion 92 communicates with an external storage medium according to a predetermined communication method to acquire identification information stored in the external storage medium. After a job setting content is accepted by a setting acceptance portion 101(described below), the identification information acquisition portion 92 communicates with the external storage medium to receive the identification information. In the present embodiment, the RFID is adopted as a predetermined communication method, for example. The external storage medium will be described using an example of a card type storage medium (hereinafter, referred to as key card) which stores identification information and communicates via RFID. A key card is given to each user of the image forming apparatus 1. The key card stores identification information (user ID) specific to each user. That is, the identification information given to one user is stored in a key card possessed by the one user.

The control unit 10 includes the setting acceptance portion 101, an authentication portion 102, and a display control portion 103. The CPU operates in accordance with instructions of a program stored in a memory, a ROM or a HDD 81 inside the control unit 10, so that the control unit 10 performs respective functions of these portions. Alternatively, it may be that the control unit 10 includes a dedicated hardware circuit corresponding to each portion described above to perform its function. It should be noted that the control portion 100 may concurrently perform a role of the display control portion 103.

The setting acceptance portion 101 sets a job setting content which activates respective portions included in the image forming apparatus 1, such as the image forming portion 12 and the document reading portion 5, according to an instruction given by a user. For example, a user operates the operation portion 47 to print out an image of a document formed by the image forming portion 12. As a print setting for printing the image of a document, values are entered, which relate to double-sided or single-sided print, document size, number of copies, sort, aggregation, resolution, color or monochrome print, frame removal, enlargement/reduction and the like. Then, the setting acceptance portion 101 accepts the entered values and stores them as respective item values for print setting to form an image. Furthermore, the user operates the operation portion 47 to execute reading (scanning) of a document by the document reading portion 5. As a setting for reading a document, values are entered, which relate resolution, color/monochrome, enlargement/reduction and the like. Then, the setting acceptance portion 101 accepts the entered values and memorizes them as respective item values for setting to read the document. In this connection, the setting acceptance portion 101 accepts setting for other operation of the image forming apparatus 1 as well as the above-described print setting and document reading setting.

The authentication portion 102 verifies whether the identification information acquired from the key card by the identification information acquisition portion 92 is authentic identification information, for which the operation of the image forming apparatus 1 is approved. The authentication portion 102 stores all identification information pieces for which the operation of the image forming apparatus 1 has been approved in a memory or the like. If identification information acquired from the key card by the identification information acquisition portion 92 matches any one of the authentic identification information pieces stored in the memory, the authentication portion 102 determines that the acquired identification information is authentic. Unless it matches any one of the authentic identification information pieces, the authentication portion 102 determines that the acquired identification information is not authentic.

The display control portion 103 executes display control of the display portion 473. When a job setting content is accepted by the setting acceptance portion 101, the display control portion 103 performs such control as causing the display portion 473 to display a message inviting a user to set a key card communicable with the identification information acquisition portion 92.

If the authentication portion 102 verifies the authenticity of the identification information and the identification information acquisition portion 92 is incommunicable with the key card, the control portion 100 causes the respective operational portions of the image forming apparatus 1 to execute a job according to a job setting content set by the setting acceptance portion 101 at this point of time.

Figure 3:
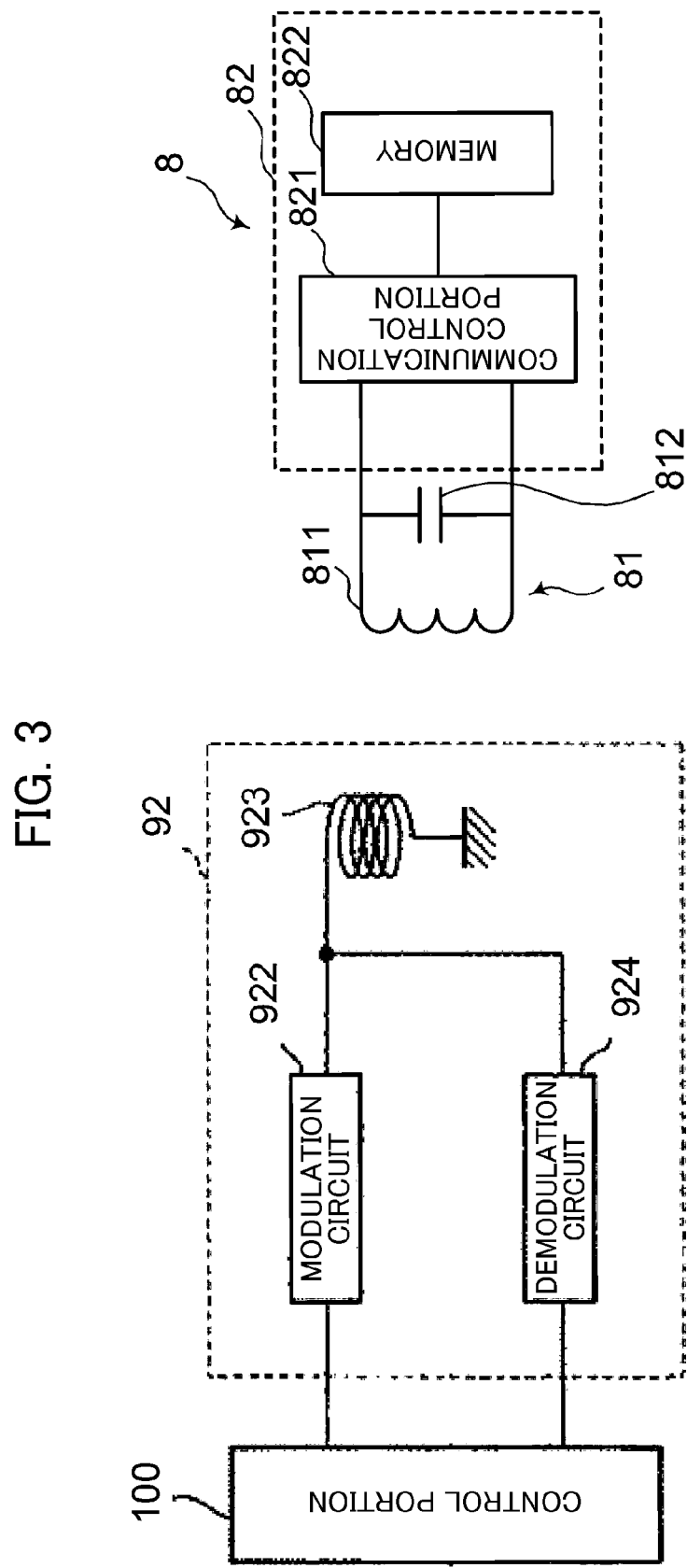
FIG. 3 is a diagram showing a schematic setup of an identification information acquisition portion and a key card.

Next, the setups of the identification information acquisition portion 92 and the key card will be described below. FIG. 3 is a diagram showing a schematic setup of the identification information acquisition portion 92 and the key card.

The identification information acquisition portion 92 is a RFID reader/writer which communicates with the key card (RFID tag) 8 through RFID communication. The identification information acquisition portion 92 includes a modulation circuit 922, an antenna 923 and a demodulation circuit 924. As described above, the identification information acquisition portion 92 is connected to the control portion 100.

The key card 8 is, for example, a passive type tag, which includes a resonance circuit 81 and a communication portion 82.

The resonance circuit 81 includes an antenna 811 and a resonance capacitor 812. The antenna 811 is a loop antenna of a coil. Radio communication with the identification information acquisition portion 92 is performed via the antenna 811.

The antenna 811 and the resonance capacitor 812 constitute the resonance circuit 81. The resonance circuit 81 serves as a filter which selects I/O signals from the antenna 811, such that they have frequency components including only a resonance frequency of the resonance circuit 81 and a predetermined range of frequencies in the vicinity of the resonance frequency.

The communication portion 82 includes a communication control portion 821 and a memory 822. The communication control portion 821 contains a semiconductor chip (wireless IC chip) and controls transmission and reception of data to be communicated via electromagnetic wave through the antenna 811. The communication control portion 821 generates electromotive force using electromagnetic wave received from the identification information acquisition portion 92 by the antenna 811 and drives an accommodated circuit with the electromotive force to communicate with the identification information acquisition portion 92.

The memory 822 is a rewritable nonvolatile memory, for example, which can hold data during power-off period of the identification information acquisition portion 92. The identification information specific to the user of the key card 8 is stored in the memory 822. The identification information stored in the memory 822 is transmitted to the identification information acquisition portion 92 from the antenna 811 under a control of the communication control portion 821 and received by the identification information acquisition portion 92.

Communication by the identification information acquisition portion 92 and the key card 8 will be described below.

The control portion 100 of the identification information acquisition portion 92 outputs command information directed to the key card 8 (in the present embodiment, a transmission request of identification information) to the modulation circuit 922. The modulation circuit 922 modulates a carrier wave in accordance with the command information. The antenna 923 transmits a modulation wave as a query signal.

The antenna 811 of the key card 8 receives the query signal transmitted from the antenna 923 of the identification information acquisition portion 92, and converts it to an electric signal. The antenna 811 outputs this electric signal to the communication control portion 821. The communication control portion 821 demodulates the query signal received by the antenna 811 to extract the command information. In response to the command information (transmission request of the identification information), the communication control portion 821 reads out identification information stored in advance from the memory 822. For example, when the antenna 811 receives a carrier wave of a query signal transmitted from the identification information acquisition portion 92, the communication control portion 821 generates a subcarrier wave (reflected wave) from the carrier wave. By applying the subcarrier to the antenna 811 at a constant cycle, the identification information stored in the memory 822 is carried on the subcarrier wave. The subcarrier wave is transmitted as a reply signal to the identification information acquisition portion 92 from the antenna 811.

The antenna 923 of the identification information acquisition portion 92 receives the reply signal transmitted from the antenna 811 of the key card 8, converts it to an electric signal. The antenna 923 outputs this electric signal to the demodulation circuit 924. The demodulation circuit 924 demodulates the electric signal to extract the identification information and outputs the extracted identification information to the control portion 100.

Figure 4:
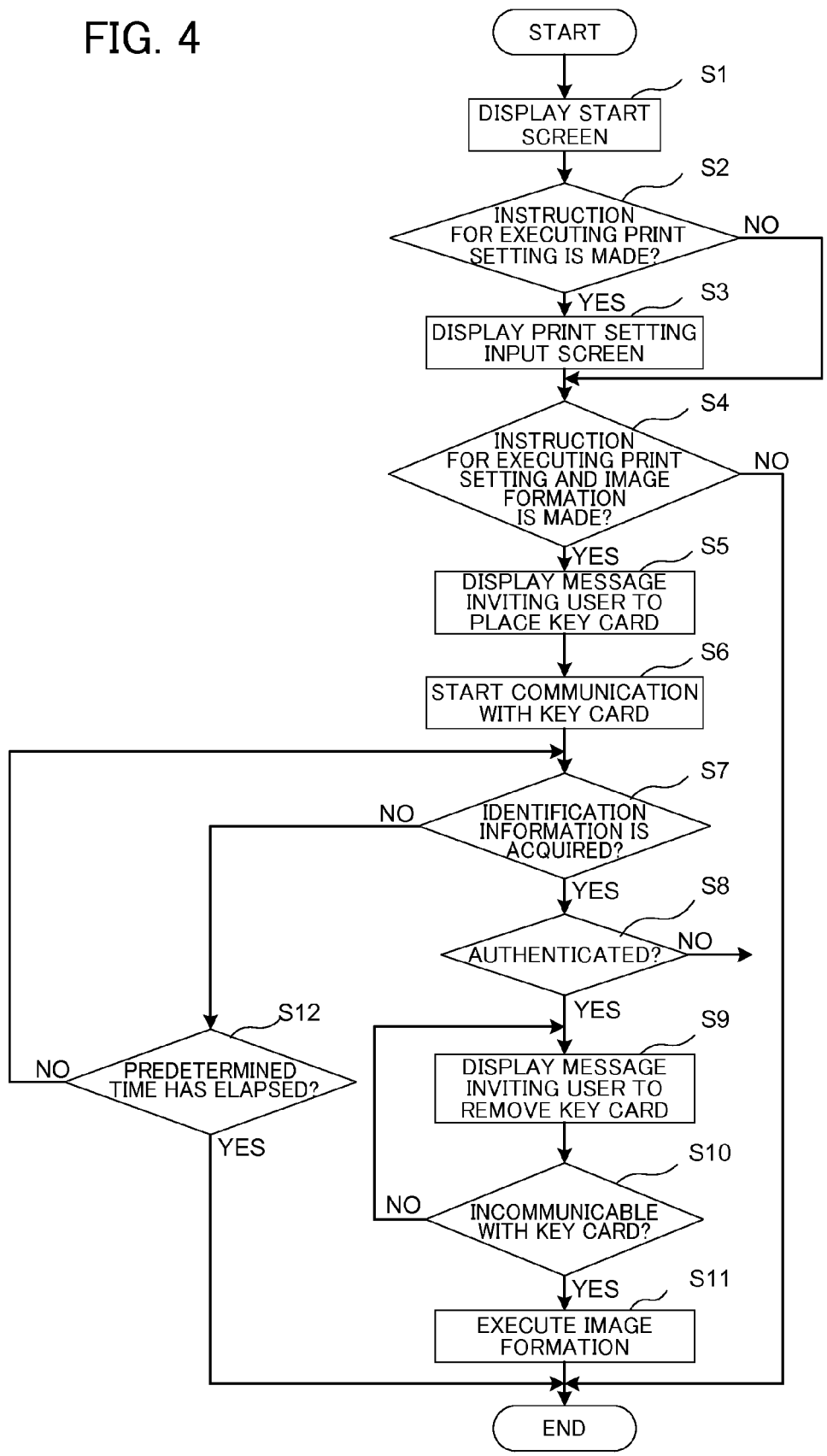
FIG. 4 is a flow chart showing processing of image formation based on authentication of identification information in the image forming apparatus.

Next, processing of image formation based on authentication of identification information in the image forming apparatus 1 will be described below. FIG. 4 is a flow chart showing a flow of processing of image formation based on authentication of identification information in the image forming apparatus 1. FIGS. 5A-5E are diagrams showing examples of a display screen of the display portion 473. Hereinafter, an example will be described, in which a content for setting print operation (setting for printing) is accepted by the setting acceptance portion 101 as a job setting content.

Figure 5A:
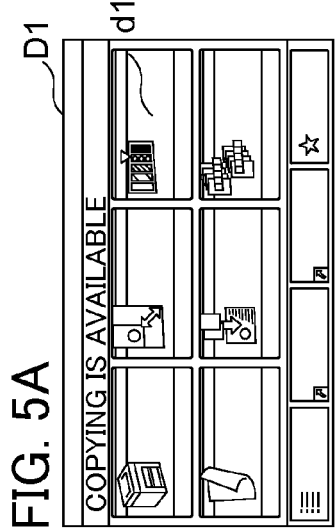
FIGS. 5A-5E are diagrams showing examples of a display screen of a display portion.
Figure 5B:
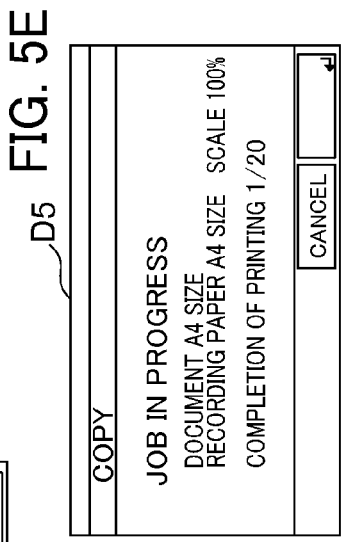
Figure 5C:
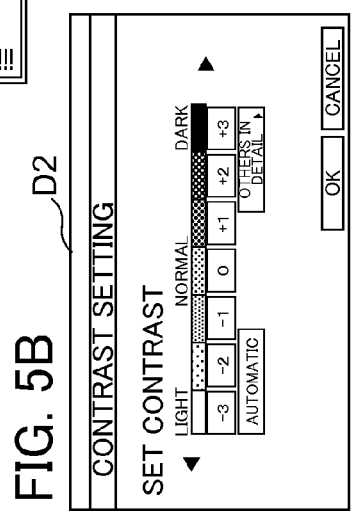
Figure 5D:
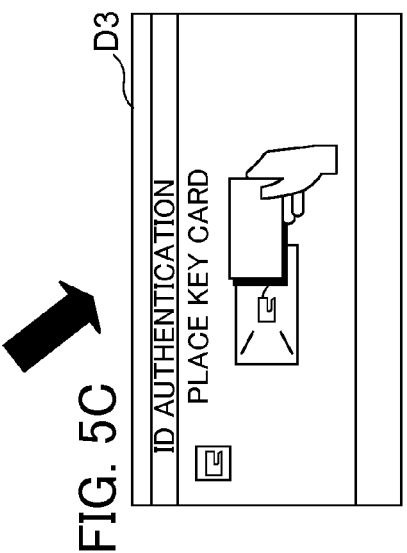

When the image forming apparatus 1 stands by for an instruction from a user after its power switch is turned on, the display control portion 103 causes the display portion 473 to display a start screen D1 illustrated in FIG. 5A (S1).

When, for example, a setting button d1 on the start screen D1 is depressed by the user, an instruction for executing a print setting given by the user (instruction for switching the display to a screen for entering a value of each item about the print setting) is accepted by the operation portion 47 through a touch panel function provided on the display portion 473 (YES in S2). Then, the display control portion 103 causes the display portion 473 to display a print setting input screen D2 (see FIG. 5B) which accepts an input of the value of an item corresponding to the depressed button (S3). Unless an instruction for executing the print setting is entered by the user, the processing proceeds to S4 as a default print setting.

According to an instruction entered by the user through the operation on the touch panel of the display portion 473 or the operation portion 47 on the print setting input screen D2, a value about each print setting item, for example, contrast, is entered. The setting acceptance portion 101 accepts the entered value. When the start button 471 provided on the operation portion 47 is depressed, an instruction for executing the image formation according to the print setting is entered (YES in S4). Then, the display control portion 103 causes the display portion 473 to display a display screen D3 (see FIG. 5C) showing a message which invites the user to place the key card 8 on or over the reading portion 921 of the identification information acquisition portion 92 (S5). If no instruction for image formation is entered by the user due to input of a cancel instruction, for example, by depressing a clear button provided on the operation portion 47 (NO in S4), no image formation is performed and the processing is terminated.

After the message is displayed on the display screen D3, the control portion 100 causes the identification information acquisition portion 92 to transmit a carrier wave corresponding to command information indicating an instruction for transmitting identification information stored in the key card 8, and renders the identification information acquisition portion 92 to be communicable with the key card 8. If the user places the key card 8 over the reading portion 921 under this condition, the identification information acquisition portion 92 starts communication with the key card 8 (S6).

As a result of the communication between the identification information acquisition portion 92 and the key card 8, the identification information acquisition portion 92 acquires identification information from the key card 8 and the control portion 100 receives the identification information from the identification information acquisition portion 92 (YES in S7). Subsequently, the authentication portion 102 verifies whether the identification information acquired from the key card 8 by the identification information acquisition portion 92 is authentic with respect to an operation of the image forming apparatus 1 (S8).

If the authentication portion 102 verifies the authenticity of the acquired identification information (YES in S8), the display control portion 103 causes the display portion 473 to display a display screen D4 (see FIG. 5D) showing a message which invites the user to remove the key card 8 from the reading portion 921 of the identification information acquisition portion 92(S9). In this connection, it is a very short time period felt by the user until the identification information acquisition portion 92 acquires identification information through communication with the key card 8, and the authentication portion 102 verifies the authenticity of the identification information. For this reason, displaying of a message in S9 may be conducted on the same screen as displaying of the message in S5. In other words, the display control portion 103 causes the display portion 473 to display the display screen D3 in S5, which displays not only a message inviting a user to place the key card 8 over, but also a message inviting the user to remove the key card 8 from the reading portion 921 of the identification information acquisition portion 92.

If the identification information acquisition portion 92 acquires no identification information and the control portion 100 receives no identification information from the identification information acquisition portion 92 within a predetermined amount of time (e.g., 30 seconds) after the display portion 473 displays the display screen D3 showing a message inviting a user to place the key card 8 on or over the reading portion 921 of the identification information acquisition portion 92 (NO in S7, YES in S12), the processing is terminated without image formation performed by the image forming portion 12. A time period in which the control portion 100 stands by for receiving the identification information from the identification information acquisition portion 92 continues until the predetermined time elapses (NO in S7, NO in S12).

Unless the authentication portion 102 verifies the authenticity of the acquired identification information, i.e., if the authentication portion 102 determines that it is unauthentic (NO in S8), the processing is terminated without any image formation performed by the image forming portion 12.

After, the identification information is acquired by the identification information acquisition portion 92 through communication with the key card 8 and the display screen D3 is displayed on the display portion 473 as described above, the control portion 100 determines that the identification information acquisition portion 92 is incommunicable with the key card 8 (YES in S10). Subsequently, the control portion 100 causes the image forming portion 12 to form an image according to the job setting content set as described above (S11). That is to say, the control portion 100 executes a job according to the job setting content accepted by the setting acceptance portion 101.

During a time period when the control portion 100 determines that the identification information acquisition portion 92 is communicable with the key card 8 (NO in S10), the display control portion 103 causes the display portion 473 to continue to display the display screen D4 and invites the user to remove the key card 8 from the reading portion 921.

For example, during a time period when the user continues placing the key card 8 over the reading portion 921, the identification information acquisition portion 92 continues communicating with the key card 8 and reading the identification information from the key card 8. When the user takes the key card 8 off the reading portion 921 so that the key card 8 is out of the range of communication with respect to the identification information acquisition portion 92, the identification information acquisition portion 92 becomes incapable of reading the identification information from the key card 8. As a result of such an occurrence, the control portion 100 determines that the identification information acquisition portion 92 is incommunicable with the key card 8.

When the user takes the key card 8 off the reading portion 921 and the key card 8 is out of the range of communication with respect to the identification information acquisition portion 92, the control portion 100 causes the image forming portion 12 to execute the image formation.

Figure 5E:
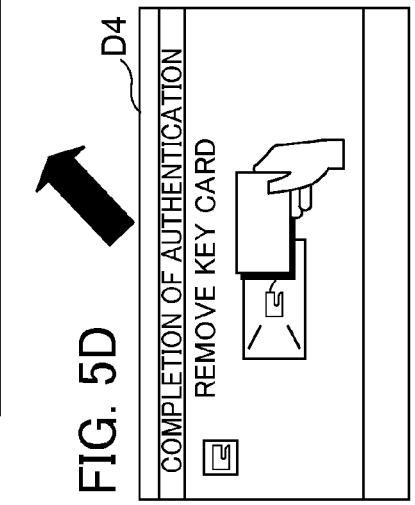

After the execution of image formation is started, the display control portion 103 switches the display screen of the display portion 473 to a job execution display screen D5 illustrated in FIG. 5E, notifying the user of the image formation in progress. After the image formation is terminated, the display control portion 103 causes the display screen of the display portion 473 to return to the start screen D1.

As described above, since it is required that the identification information acquisition portion 92 is incommunicable with the key card 8 as a condition for the control portion 100 to execute the image formation, the user is sure to take the key card 8 off the reading portion 921 to execute the image formation. As a result, it is possible that the present embodiment provides the user with an incentive to take the key card 8 off the image forming apparatus 1 after the authentication of the identification information. Furthermore, since a time period in which the user maintains the image forming apparatus 1 to be communicable with the key card 8 decreases, it is possible to prevent the user from forgetting to take the key card 8 off the image forming apparatus 1 more securely than ever.

When the setting acceptance portion 101 accepts a print setting, the display control portion 103 causes the display portion 473 to display the display screen D3 showing a message inviting the user to place the key card 8 over the reading portion 921 of the identification information acquisition portion 92 (S5). Consequently, it is easier for the user to grasp a timing of placing the key card 8 over the reading portion 921 of the identification information acquisition portion 92 through visual recognition of the display screen D3.

Furthermore, the display control portion 103 causes the display portion 473 to display the display screen D4 showing a message inviting the user to remove the key card 8 from the reading portion 921 of the identification information acquisition portion 92 after the authentication of the identification information performed by the authentication portion 102 (S9). Consequently, it is easier for the user to grasp a timing of removing the key card 8 from the reading portion 921 of the identification information acquisition portion 92 easily through visual recognition of the display screen D4.

The setup and effect of the present disclosure are summarized as follows. It may be preferable that the present disclosure further includes an authentication portion configured to determine whether the identification information acquired by the identification information acquisition portion is authentic with respect to an operation of the image forming apparatus. The control portion executes the job being set according to the accepted job setting content for a case where the authentication portion determines authenticity of the identification information and the identification information acquisition portion becomes incommunicable with the external storage medium.

According to the setup described above, the identification information acquisition portion, acquires the identification information about the user from the external storage medium after the job setting content is accepted by the setting acceptance portion. Accordingly, the user executes the operation of causing the identification information acquisition portion to acquire the identification information stored in the external storage medium after the user executes the operation of entering the job setting content. Subsequently, if the identification information is authentic and the identification information acquisition portion is incommunicable with the external storage medium, the control portion executes a job according to the accepted job setting content. Accordingly, the user executes an operation of setting the external storage medium to be free from acquisition of any identification information performed by the identification information acquisition portion, for example, an operation of placing the external storage medium away from the image forming apparatus, in order to make the control portion execute a job such as image formation and scanning after the identification information acquisition portion acquires identification information from the external storage medium and authenticates the identification information. As a result, it is possible that the present disclosure provides the user with an incentive for executing an operation for placing the external storage medium away from the image forming apparatus. Furthermore, a time period will decrease, in which the user maintains the external storage medium to be accessible for acquisition of its identification information performed by the image forming apparatus. In this manner, it is possible to prevent the user from forgetting to take the external storage medium off the image forming apparatus more securely than before.

It may be preferable that the present disclosure includes the display portion configured to display instructions for a user and the display control portion. The display control portion causes the display portion to display a message inviting the user to set the external storage medium to be communicable with the identification information acquisition portion, when the setting acceptance portion accepts the job setting content. The identification information acquisition portion acquires the identification information from the external storage medium, while the display control portion is causing the display portion to display the message.

According to the above-described setup, when the job setting content is accepted by the setting acceptance portion, the display control portion causes the display portion to display the message inviting the user to set the external storage medium to be communicable with the identification information acquisition portion. When this message is displayed, the identification information acquisition portion acquires the identification information from the external storage medium. Accordingly, it is easier for the user to grasp a timing of performing an operation for causing the identification information acquisition portion to acquire the identification information from the external storage medium.

It may be preferable that the display control portion causes the display portion to display the message inviting the user to set the external storage medium to be incommunicable with the identification information acquisition portion, after the authentication portion verifies authenticity of the identification information.

According to the present setup, it is easier for the user to grasp a timing of setting the external storage medium incommunicable with the identification information acquisition portion after the user performs an operation for causing the identification information acquisition portion to acquire the identification information from the external storage medium.

It should be noted that the present disclosure is not limited to the setup of the above-described exemplary embodiment, but may be modified in a variety of forms. For example, although the authentication portion 102 is provided at the control unit 10 of the image forming apparatus 1 in the present embodiment, it is not limited to this setup. It may alternatively be that the authentication portion 102 is provided at an external device, which is mechanically separate from the image forming apparatus 1 and wirelessly connected to the image forming apparatus 1 through network connection. In this case, the authentication portion 102 communicates with the control unit 10 through the network interface 91.

The invention claimed is:

1. An image forming apparatus, comprising:
   an operation portion including a display portion configured to display instructions for the user and a start button;
   a setting acceptance portion configured to accept from a user via the operation portion a job setting content for setting a job executable by the image forming apparatus and to accept an instruction for executing the job in response to the start button being depressed by the user;
   an identification information acquisition portion configured to start communicating with an external storage medium storing identification information specific to the user so as to acquire the identification information from the external storage medium after the job setting content and the instruction for executing the job are accepted by the setting acceptance portion;
   an authentication portion configured to verify whether the identification information acquired by the identification information acquisition portion is authentic with respect to an operation of the image forming apparatus;
   a display control portion configured to cause the display portion to display a message inviting the user to set the external storage medium to be communicable with the identification information acquisition portion, when the setting acceptance portion accepts the job setting content and the instruction for executing the job; and
   a control portion configured to execute the job being set in accordance with the accepted job setting content, for a case where the identification information acquired by the identification information acquisition portion is authentic and the identification information acquisition portion becomes incommunicable with the external storage medium,
   wherein the setting acceptance portion is configured to accept the job setting content and the instruction for executing the job before the authentication portion performs an authentication of the identification information,
   wherein the identification information acquisition portion acquires the identification information from the external storm e medium, while the display control portion is causing the display portion to display the message,
   wherein a period of time during which the control portion stands by for receiving the identification information from the identification information acquisition portion is arranged in advance to be within a range of values, the period of time starting at displaying of the message on the display portion, and
   wherein the control portion is configured to terminate the job without executing thereof when elapsed time has exceeded the range of values.

2. The image forming apparatus according to claim 1, wherein the display control portion causes the display portion to display the message inviting the user to set the external storage medium to be incommunicable with the identification information acquisition portion, after the authentication portion determines authenticity of the identification information.

* * * * *